United States Patent Office 3,769,339
Patented Oct. 30, 1973

3,769,339
PROCESS FOR THE PRODUCTION OF CALCIUM TARTRATE
Hans Wagner and Fritz Schäfer, Constance, Germany, assignors to Deutsche Gold- und Silber-Scheideanstalt vormals Roessler, Frankfurt am Main, Germany
No Drawing. Continuation of abandoned application Ser. No. 765,680, Oct. 7, 1968. This application June 30, 1971, Ser. No. 158,551
Int. Cl. C07c 59/14
U.S. Cl. 260—536      2 Claims

ABSTRACT OF THE DISCLOSURE

Calcium tartrate is produced by heating acid calcium maleate in the presence of hydrogen peroxide and the substantially complete absence of iron ions using as catalysts tungstic or molybdic acids or the ammonium or alkali metal salts thereof to yield an oxidation product that is hydrolyzed to calcium tartrate.

CROSS-REFERENCE TO OTHER APPLICATION

This application is a continuation of copending application Ser. No. 765,680 filed Oct. 7, 1968 and now abandoned.

This invention relates to the production of calcium tartrate from acid calcium maleate.

DL tartaric acid can be produced from maleic acid or maleic acid anhydride by conversion with hydrogen peroxide in an aqueous solution at a pH of 1 to 2 using a tungstic acid catalyst. To achieve higher yields (70%), one must operate with an excess of maleic acid; the mother liquor contains fairly large quantities of maleic acid. Therefore, for the execution of the process on an industrial scale, it is necessary to find further use for the mother liquor. However, if the mother liquor is used along with other substances for the conversion of maleic acid with hydrogen peroxide, the yield will drop to less than 50% (Ind. and Engineering Chem., vol. 43, S. 1780–1786).

It is known that maleic acid is oxidized almost quantitively to disodium epoxysuccinic acid in the presence of tungstic acid at a pH of 4 to 5.5 (Payne and Williams, J. Org. Chem., 24 (1959), S. 54). To achieve this pH value, the maleic acid is partially neutralized with sodium hydroxide solution and, in the course of the oxidation is reacted, with a quantity of sodium hydroxide necessary for the production of the disodium compound. This salt of the epoxy succinic acid is quite stable and cannot be saponified through boiling in water. Hydrochloric acid, if added, produces chlormalic acid. Saponification with sulphuric acid only leads to moderate yields of calcium tartrate while forming byproducts.

Accordingly, it is an object of this invention to provide a method for producing tartrates in good yield without the disadvantages inherent in the prior art.

In accomplishing this object, one feature of this invention resides in oxidizing acid calcium maleate with hydrogen peroxide in the presence of water and a catalyst which is tungstic acid, molybdic acid or their ammonium or alkali metal salts, or mixtures thereof, at temperature of about 50° C. to about 90° C. in the substantially complete absence of iron ions to yield a reaction product which is hydrolyzed to produce calcium tartrate.

Other objects, features, and advantages of this invention will appear from the description which follows.

It has now been found that calcium tartrate can be produced in more than 90% yield if one oxidizes calcium maleate with at most equimolecular quantities of hydrogen peroxide with a practically complete absence of iron ions in the presence of tungstic or molybdic acid and/or their ammonium or alkali salts as catalysts and in the presence of water at a temperature of about 50° to about 90° C. and if one then hydrolyzes the oxidation product, without intermediate isolation, through boiling and if one subsequently treats the mother liquor, which has been freed of the deposited calcium tartrate, with calcium hydroxide.

During oxidation of calcium maleate, the calcium salt of epoxy succinic acid is formed initially, along with free maleic acid. The latter will saponify to the calcium salt through boiling, without substantial formation of the byproduct of the calcium tartrate.

In the case of the process according to the invention, the hydrogen peroxide can be used in any desired concentration. Generally speaking, however, concentrations of about 24 to about 40% are recommended.

It is essential that at most one mol of hydrogen peroxide be used per mol of acid calcium maleate. Larger quantities of $H_2O_2$ are to be avoided. On the other hand, however, one can use smaller quantities also with good success.

Furthermore, it is essential that one uses solutions which are practically free of iron ions; even 30 to 40 p.p.m. of iron ions will disturb the reaction and lead to byproducts. Therefore, the iron ions should be removed prior to conversion according to methods known per se, for example, through precipitation with potassium hexacyano ferrate.

The oxidation catalysts can be used in the case of this process in the usual quantities of about 0.1 to about 3%, advantageously in a quantity of about 1%.

The first step of the conversion of the reaction the epoxydization, is carried out preferably at the temperature between about 60° and 80° C. The hydrolysis usually takes place through heating to about 100° C. and boiling with reflux during a time period of about 1½ hours.

EXAMPLE 196 g. of maleic acid anhydride (2 mols) are dissolved at 60° C. in 400 ml. $H_2O$ and are treated with 75 g. $Ca(OH)_2$. The solution contains 18 mg. of iron which are precipitated with 400 mg. $K_4Fe(CN)_6 \cdot 3H_2O$ and are filtered off with A-carbon.

2 g. $H_2WO_4$ are added as a potassium salt and 100 g. $H_2O_2$ 35 percent (stabilized with 0.1% of dipicolinic acid) are added drop by drop at 60° C. This is stirred for 2 hours at 60 to 65° C. and for 1 hour at 70 to 80° C.; after that the $H_2O_2$ has been completely used up and one boils for 2 hours with reflux. After standing overnight the precipitated calcium tartrate is drawn off and dried.

One will obtain 263 g. of calcium tartrate·$4H_2O$. Through a second precipitation with 22 g. $Ca(OH)_2$ one can obtain another 20 g. of calcium tartrate.

One will obtain 263 g. calcium tartrate with a content of 96.8%, which corresponds to a yield of 98% of the theory.

The DC of a calcium tartrate sample treated with $H_2SO_4$ shows no organic impurities.

If the mother liquor is supplemented with 1 mole of maleic acid anhydride, then in the course of further conversions a practically unchanged good yield of calcium tartrate will be obtained.

What is claimed is:

1. Process for the production of calcium tartrate comprising:

heating at a temperature of about 50° to about 90° C. a substantially iron free aqueous mixture of acid calcium maleate, hydrogen peroxide, and a catalyst of tungstic acid, molybdic acid, their ammonium or alkali metal salts or mixtures thereof, the molar ratio of hydrogen peroxide to acid calcium maleate not exceeding 1:1, boiling the resulting reaction mixture to hydrolyze the intermediate reaction product, and recovering calcium tartrate.

2. The process of claim 1 wherein calcium hydroxide is added to the reaction mixture and additional quantities of calcium tartrate are recovered therefrom.

References Cited
UNITED STATES PATENTS 2,754,325  7/1956  Smith _____ 260—536

LORRAINE A. WEINBERGER, Primary Examiner

P. J. KILLOS, Assistant Examiner

U.S. Cl. X.R.

260—348 A